Dec. 14, 1965   F. C. ALBRIGHT   3,223,069
OVERLOAD INDICATING DEVICE FOR SHOCK ABSORBERS
Filed Nov. 4, 1963   2 Sheets-Sheet 1
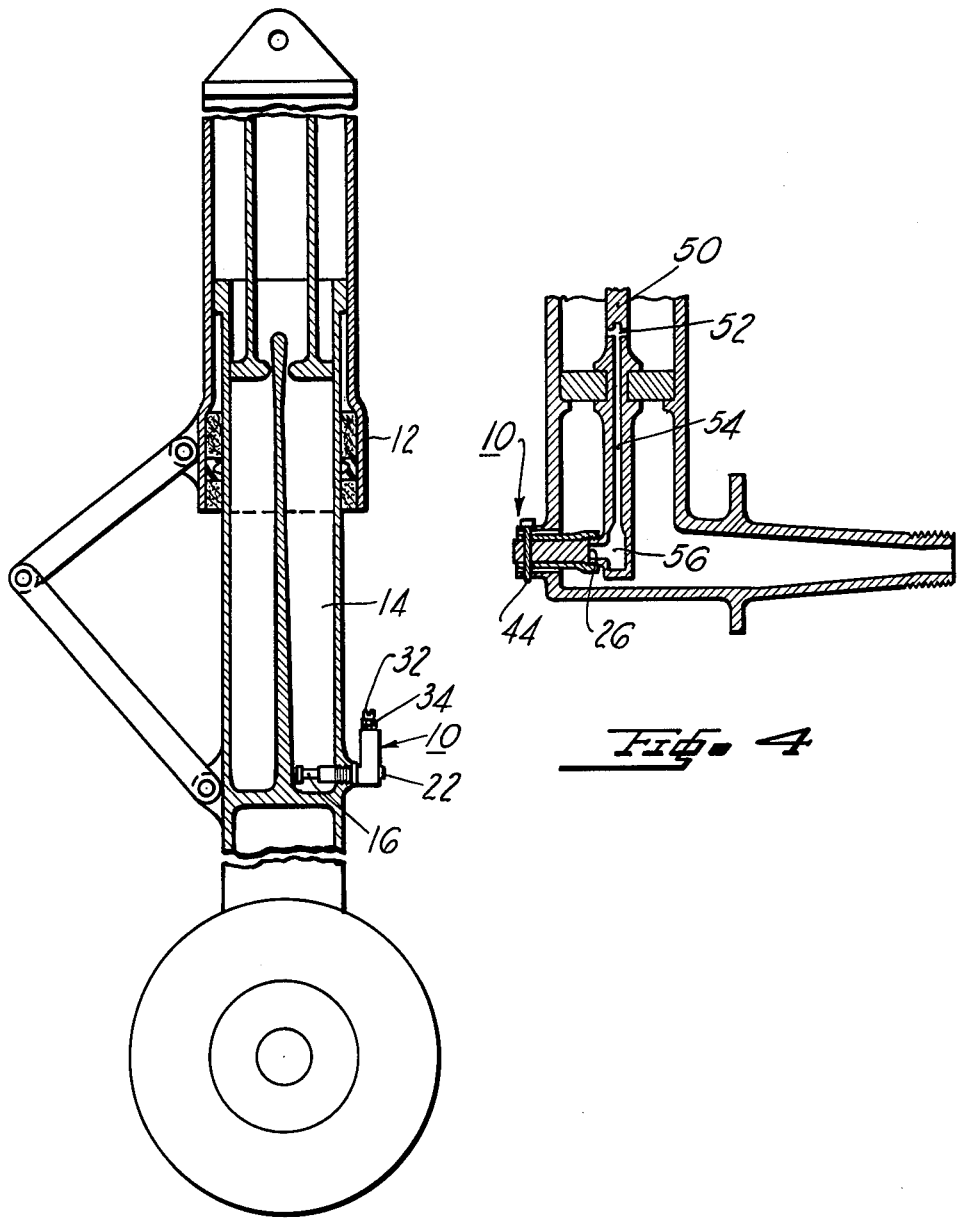
INVENTOR.
FRANKLIN C. ALBRIGHT
BY
Richard G. Gib
ATTORNEY Dec. 14, 1965   F. C. ALBRIGHT   3,223,069
OVERLOAD INDICATING DEVICE FOR SHOCK ABSORBERS
Filed Nov. 4, 1963   2 Sheets-Sheet 2
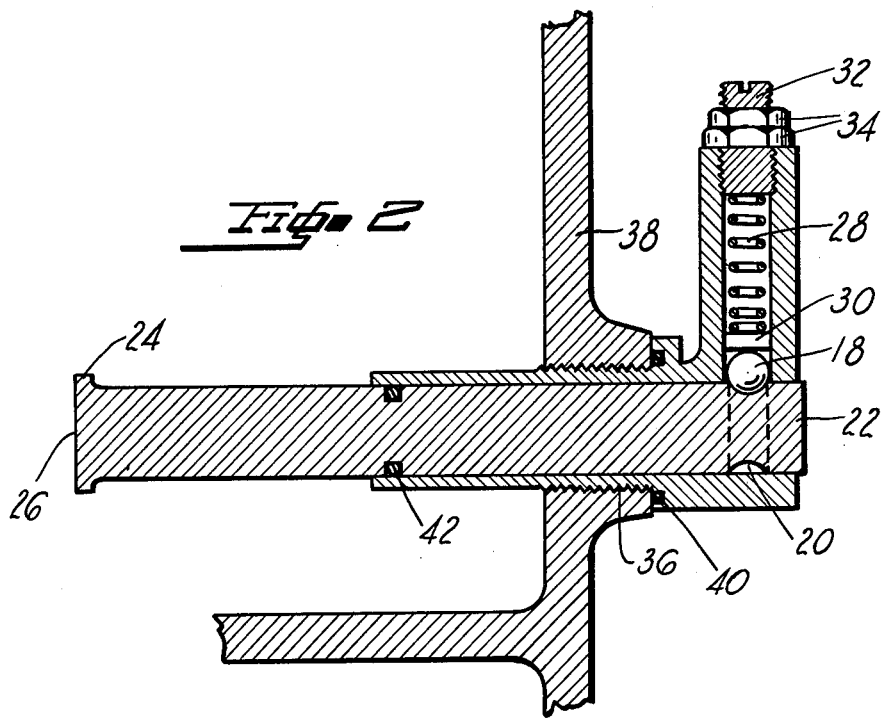
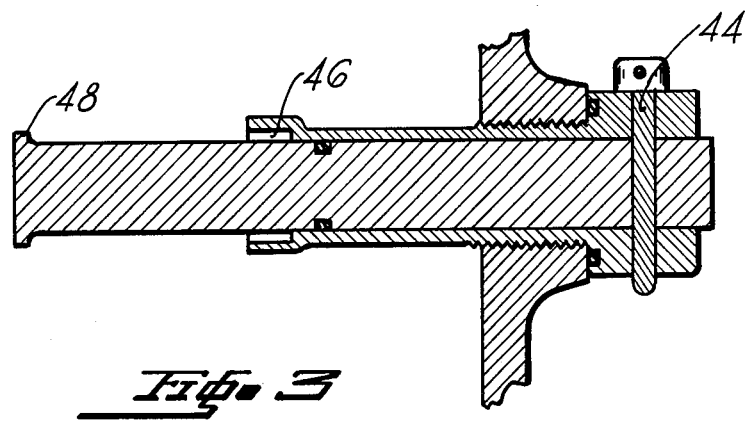
INVENTOR.
FRANKLIN C. ALBRIGHT
BY
Richard G. Geib
ATTORNEY

United States Patent Office 3,223,069
Patented Dec. 14, 1965

3,223,069
OVERLOAD INDICATING DEVICE FOR SHOCK ABSORBERS
Franklin C. Albright, South Bend, Ind., assignor to The Bendix Corporation, South Bend, Ind., a corporation of Delaware
Filed Nov. 4, 1963, Ser. No. 321,230
5 Claims. (Cl. 116—70)

This invention relates to a means for visually detecting overloading of a fluid pressure device such as a shock absorber.

As landing speeds of aircraft have increased and wing spans decreased in order to get the high performance, high mach characteristics, it has become apparent that on landing aircraft shock absorbers are being loaded dangerously close to buckling loads, and, in fact, have been repeatedly functioning under these excess loading conditions. With this type of operation, failures have been increasing, and there has been no readily available means of detecting an approaching failure. It is therefore a principal intent of my invention to provide an indicating device capable of indicating excessive axial loading of an aircraft shock absorber.

A more particular object of my invention is to provide a pressure responsive means releasably held within a fluid pressure chamber of a shock absorber such that excess loading will release the holding means and allow a visual indication of excess axial loading for the shock absorber.

A still further object of my invention is to provide a resettable visual indicating means for hydraulic devices.

Other objects and advantages of my invention will appear from the description of the following drawings in which:

FIGURE 1 shows a cross sectional view of an aircraft shock absorber employing the principles of my invention;

FIGURE 2 is a cross sectional exploded detail of a portion of the shock absorber of FIGURE 1 employing a preferred holding means for the visual indicating device in accordance with my invention;

FIGURE 3 is another exploded detail of a pressure responsive indicating device with a modified holding means as respects FIGURE 2; and FIGURE 4 is a modification of my visual indicating means showing still another way of mounting a pressure responsive device for indicating axial loading of a shock absorber.

My shock strut overload device 10 shown in FIGURE 1 mounted in an aircraft type shock absorber 12 is arranged such as to indicate an overload of an axial load and not overloading in any other planes. Since the side load and drag usually depend to a certain degree on the vertical or axial load, then to know when the strut has been overloaded by an axial load would be a fair indication that the strut would receive some special inspection.

The general arrangement of this overload device shows it to be mounted in a lower chamber 14 of the shock absorber 12 so as to be activated when the pressure in this lower chamber exceeds a predetermined amount.

In the design an overload indictor rod 16 is affected directly by the pressure in chamber 14. The rod is retained in place (see FIGURE 2) by a ball 18 resting in a groove 20 at the outer end 22 of the rod. An adjustable spring force on the ball will determine the pressure loading which will force the ball out of the groove and permit the rod to extend outward until it reaches a stop 24 provided on the inside end 26. This adjustable spring force is provided by a spring 28 held between a bearing plate 30 and an adjustable set screw 32 which may be locked in any one of several adjustments by a lock nut means 34. As seen, the overload device 10 is threaded as at 36 through a wall 38 surrounding the lower chamber 14, and an "O" ring 40 is provided to effect the necessary seal of the juncture of the overload device and the wall 38. In addition, I have provided a rolling type "O" ring seal 42 on the indicating rod to further insure against the loss of fluid within the lower pressure chamber 14 of the shock absorber 12.

After an overload condition has occurred and the shock absorber 12 has been inspected and found to be operable the overload indicating rod may be reset by pushing back in place, and it is ready to be reactivated by the pressure of an excessive axial load on the strut. With regard to the showing of FIGURE 3, I have also shown a design which incorporates a shear pin 44 for holding the indicating rod until an overload condition occurs. In addition, I have also shown in this design a snubber arrangement comprising an annular chamber 46 on the inner end of the overload device which cooperates with a flange 48, similar to the stop 24, to slow the outward movement of the indicating rod and prevent shearing loads as the rod reaches the end of its travel outwardly. In this instance, to reactivate the device, it is necessary to remove the shear pin, push the indicator rod in place, and replace the shear pin.

The location of this overload device on the strut will vary for each strut design. It can be located on the side of the strut, as shown, or it can be located on a tubular extension member which connects to the pressure chamber, as seen in FIGURE 4, whereby a shock strut metering pin 50 is provided with a radial passage 52 leading to an axial passage 54 that communicates with a chamber 56 opening into my overload device 10 so that fluid pressure will abut the inner end 26 and upon sufficient build-up will fracture the shear pin 44 and project my indicator rod.

The indicator can be so painted that it will indicate red when extended, or the design can incorporate a levered red flag (not shown) which will become visible when activated by the indicator rod. The observance of this indicator would be put on the check-off list of the items for the crew of the aircraft so that it would be a permanent log record of the airplane. When the overload device is activated, then a special inspection of the landing gear, as aforementioned, and aircraft connecting structure should be made and recorded in the log.

The maximum pressure in the lower chamber of the strut would be determined during drop testing of the strut in the laboratory. The overload device would then be set for this value, or if all parts had a margin, then the device could be set for the percentage over this laboratory value.

I have no doubts that other forms and constructions can be readily thought of by those skilled in the art to which my invention relates; i.e., an overload pressure indication can be obtained by placing a pressure switch in the same location as the indicator rod occupies in the mechanical indicator. This electrical pressure switch would be operated only when the pressure exceeded the normal landing pressure. The red light indicator could be located on the strut or in the cockpit of the airplane. In order to be noticable the red light should remain on for a length of time by having a delayed cut-off on the actuating switch. In place of a red light indicator the pressure switch can be made to activate a solenoid which would trip any type flag or signal that would be readily visible to the pilot or crew. This trip mechanism could then be reset after inspection.

In view of the multitude of modifications available, I do not intend it to be limited by the foregoing description but rather by the appended claims.

I claim:
1. In an aircraft shock absorber having a metering pin with fluid passages therein for transmital of pressures created by axial loading of the shock absorber, an indicating device to foretell overloading thereof, said device comprising:
- a housing connected to said metering pin having a central opening therethrough;
- a movable means within said housing creating a variable volume chamber behind said means adjacent said metering pin passages; and
- a lock means adapted to hold said movable means until overcome by pressure in said variable volume chamber.

2. In an aircraft shock absorber according to claim 1 wherein said lock means is characterized as including:
- a ball arranged to cooperate with a detent in said movable means;
- a spring for biasing said ball into said detent; and
- an adjusting device for regulating the force exerted by said spring.

3. In an aircraft shock absorber according to claim 1 wherein said lock means is characterized as a releasable holding means in the form of a shear pin.

4. In an aircraft shock absorber according to claim 1 wherein said movable means includes a tubular means and a piston means reciprocable therein with said tubular means being counterbored at one end thereof and said piston means being provided with a radial flange which cooperates with the counterbore on the tubular means to provide a pressure responsive damper to retard movement of said piston as it reaches the end of its travel.

5. In an aircraft shock absorber having a metering pin with fluid passages therein for transmittal of pressures created by loading of the shock absorber, an indicating device to foretell overloading thereof, said device comprising:
- a housing connected to said metering pin having a central opening therethrough;
- a movable means within said housing creating a variable volume chamber behind said means adjacent said metering pin passages;
- a lock means adapted to hold said movable means until overcome by pressure in said variable volume chamber; and
- a pressure responsive damper means operatively connected within said housing to said movable means to retard movement of said movable means as it reaches the end of its travel.

References Cited by the Examiner

UNITED STATES PATENTS

| | | | |
|---|---|---|---|
| 2,077,934 | 4/1937 | Johnson | 244—104 |
| 2,263,840 | 11/1941 | Franck | 116—114 |
| 2,690,669 | 10/1954 | Giladett | 23—116 |
| 2,878,936 | 3/1959 | Scavuzzo et al. | 116—117 |
| 3,063,405 | 11/1962 | White | 116—65 |
| 3,103,952 | 9/1963 | Whiting | 116—117 |

FOREIGN PATENTS 722,837  2/1955  Great Britain.

LOUIS J. CAPOZI, *Primary Examiner.*